(12) United States Patent
Sutoh et al.

(10) Patent No.: US 7,680,983 B2
(45) Date of Patent: Mar. 16, 2010

(54) METHOD OF RESTORING DATA BY CDP UTILIZING FILE SYSTEM INFORMATION

(75) Inventors: Atsushi Sutoh, Yokohama (JP); Yasuo Yamasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 693 days.

(21) Appl. No.: 11/526,167

(22) Filed: Sep. 21, 2006

(65) Prior Publication Data
US 2008/0028144 A1    Jan. 31, 2008

(30) Foreign Application Priority Data
Jul. 27, 2006   (JP) .............................. 2006-204791

(51) Int. Cl.
G06F 13/00 (2006.01)
G06F 13/28 (2006.01)
G06F 12/00 (2006.01)
G06F 17/30 (2006.01)

(52) U.S. Cl. ......................... 711/114; 711/162; 707/204
(58) Field of Classification Search .................. 711/114, 711/162; 707/204
See application file for complete search history.

(56) References Cited

U.S. PATENT DOCUMENTS 6,189,016 B1 *  2/2001  Cabrera et al. .............. 707/203
2004/0193945 A1    9/2004  Eguchi et al.
2006/0031647 A1 *  2/2006  Hirakawa et al. ........... 711/162

FOREIGN PATENT DOCUMENTS

JP         2004-252686          9/2004

* cited by examiner

*Primary Examiner*—Pierre-Michel Bataille
*Assistant Examiner*—Edward J Dudek
(74) *Attorney, Agent, or Firm*—Townsend and Townsend and Crew LLP

(57) ABSTRACT

The storage system includes a disk drive and a processor, the processor serving as a file system input/output processing unit and a block input/output processing unit. In the storage system, the block input/output processing unit provides, to the file system input/output processing unit, storage areas of the disk drive as plural volumes including a first volume, a second volume, and a third volume, the second volume storing a block write history, the third volume storing replication data of the first volume at a specific time. The block input/output processing unit refers to the block write history in the second volume to overwrite the replication data in the third volume with replication data of the first volume being at a different time from the specific time. The block write history in the second volume further includes information about which block is associated with which file.

13 Claims, 17 Drawing Sheets

116

| JID | TIME | BLOCK NUMBER | FID | OLD DATA | NEW DATA |
|---|---|---|---|---|---|
| 5001 | 22:33:44 51 | 101 | 3 | 0x101010... | 0x111111... |
| 5002 | 22:33:44 52 | 102 | 3 | 0x110011... | 0x010101... |
| 5003 | 22:33:44 52 | 44 | 7 | 0x101101... | 0x010010... |
| 5004 | 22:33:44 53 | 103 | 3 | 0x111000... | 0x010101... |
| 5005 | 22:33:44 53 | 45 | 7 | 0x100111... | 0x011000... |
| : | : | : | : | : | : |

301  302  303  304  305  306

JOURNAL TABLE

| JID | TIME |
|---|---|
| 5001 | 22:33:44 51 |

401  402

118 SECONDARY VOLUME MANAGEMENT TABLE

| LID | TIME | FID | BLOCK NUMBER |
|-----|------|-----|--------------|
| 301 | 22:33:44 51 | 3 | 101 |
| 302 | 22:33:44 52 | 3 | 102 |
| 303 | 22:33:44 52 | 7 | 44 |
| 304 | 22:33:44 53 | 3 | 103 |
| 305 | 22:33:44 53 | 7 | 45 |
| ⋮ | ⋮ | ⋮ | ⋮ |

601  602  603  604

FILE UPDATE LOG TABLE

| FID | FILE NAME | BLOCK COUNT | BLOCK LIST | | | |
|---|---|---|---|---|---|---|
| 1 | "memo.txt" | 1 | 50 | | | ... |
| 2 | "patent.doc" | 2 | 51 | 52 | | ... |
| 3 | "budget.xls" | 9 | 101 | 102 | 103 | ... |
| 4 | "invoice.pdf" | 20 | 77 | 78 | 79 | ... |
| 5 | "address.xls" | 6 | 7 | 8 | 9 | ... |
| ⋮ | ⋮ | ⋮ | ⋮ | ⋮ | ⋮ | ⋮ |

701  702  703  704

FILE MANAGEMENT TABLE

| HOST COMPUTER-TO-NAS DEVICE COMMAND LIST | | |
|---|---|---|
| COMMAND NAME (DESCRIPTION) | INPUT | OUTPUT |
| NAS_read_write (FILE INPUT/OUTPUT) | · TYPE (R/W)<br>· FILE NAME<br>· START BLOCK NUMBER<br>· BLOCK COUNT<br>· DATA (IN CASE OF W) | · DATA (IN CASE OF R) |
| NAS_history (OBTAINMENT OF FILE UPDATE POINT LIST) | · FILE NAME | · LIST OF PAIRS OF JID AND TIME |
| NAS_get_old (OBTAINMENT OF PAST FILE DATA) | · FILE NAME<br>· JID | · CONTENT OF FILE AT DESIGNATED POINT |

| NAS DEVICE-TO-DISK DEVICE COMMAND LIST | | |
|---|---|---|
| COMMAND NAME (DESCRIPTION) | INPUT | OUTPUT |
| DISK_read_write (BLOCK INPUT/OUTPUT) | · TYPE (R/W)<br>· BLOCK NUMBER<br>· DATA (IN CASE OF W)<br>· FID | · DATA (IN CASE OF R) |
| DISK_history (OBTAINMENT OF BLOCK UPDATE POINT LIST) | · FID | · LIST OF PAIRS OF JID AND TIME |
| DISK_warp (CREATION OF SNAP AT DESIGNATED POINT) | · JID | NONE |

| NAS DEVICE-TO-DISK DEVICE COMMAND LIST ||| 
|---|---|---|
| COMMAND NAME (DESCRIPTION) | INPUT | OUTPUT |
| DISK_read_write (BLOCK INPUT/OUTPUT) | • TYPE (R/W)) <br> • BLOCK NUMBER <br> • DATA (IN CASE OF W) <br> • FID | • DATA (IN CASE OF R) |
| DISK_warp (CREATION OF SNAP AT DESIGNATED POINT) | • JID | NONE |
| DISK_get_old (OBTAINMENT OF PAST BLOCK INFORMATION) | • HEAD BLOCK NUMBER <br> • TAIL BLOCK NUMBER | • BLOCK DATA |

*FIG. 19*

METHOD OF RESTORING DATA BY CDP UTILIZING FILE SYSTEM INFORMATION

CLAIM OF PRIORITY

The present application claims priority from Japanese patent application P2006-204791 filed on Jul. 27, 2006, the content of which is hereby incorporated by reference into this application.

BACKGROUND

This invention relates to a storage system and, in particular, a technique of restoring stored data.

An information system of a corporation has a fear of shutting down abnormally due to a hardware breakdown, a bug in software, operational error on a user's part, or the like. Such cases are often accompanied by data error or a data breakdown. The data restoration technique is therefore important for corporation information systems.

For instance, a technique of restoring data using journal is disclosed in JP 2004-252686 A. According to this data restoration technique, a secondary volume is created as a copy of a primary volume, and update data written in the primary volume is stored in a journal volume.

SUMMARY

The data restoration technique using journal enables a storage system to keep recording update data and to thereby minimize data loss that is caused by a failure. However, latest data is not always necessary in the overall restorative work of a service. In this case, it is not easy to specify an occurrence time of a failure or an occurrence time of a cause of a failure which serves as a data restoration point.

Accordingly, the system is restored to a time that is presumed to be a failure occurrence point or a failure cause occurrence point. If there is a problem with restored data, the system is restored to another time. Such the repetitive job is time-consuming, and prolongs the service suspension period.

This data restoration technique which necessitates restoration of the whole volume is particularly inefficient when only a specific file needs to be restored. Since the technique deems update points of all blocks contained in the volume, instead of update points of the specific file, as candidates of the restoration point, a repetition count of the job rises unnecessarily.

This invention has been made in view of the problem described above, and it is therefore an object of this invention to provide a storage system which cuts short time spent on a repetitive job in file restoration processing.

According to an exemplary embodiment of this invention, there is provided a storage system connected to a host computer, comprising: at least one interface connected to the host computer; at least one processor connected to the interface; at least one memory connected to the processor; and at least one disk drive which stores data requested by the host computer to be written, wherein the processor serves as a file system input/output processing unit and a block input/output processing unit by executing programs to be stored in the memory, the file system input/output processing unit receiving from the host computer a request to read data from a file and a request to write data in a file, the block input/output processing unit reading and writing data from and to blocks in the disk drive, wherein the block input/output processing unit provides, to the file system input/output processing unit, storage areas of the disk drive as plural volumes including a first volume, a second volume, and a third volume, the first volume storing a file which is accessed by the host computer, the second volume storing a block write history which includes association between each of the blocks and a time when data is written in the block, the third volume storing replication data of the first volume at a specific time, wherein the block input/output processing unit refers to the block write history in the second volume to overwrite the replication data in the third volume with replication data of the first volume being at a different time from the specific time, and wherein the block write history in the second volume further includes information about which block is associated with which file.

A representative mode of this invention makes it possible to shorten the time spent on the repetitive job in the file restoration processing.

BRIEF DESCRIPTION OF THE DRAWINGS

The present invention can be appreciated by the description which follows in conjunction with the following figures, wherein:

FIG. 4 is a configuration diagram of the journal table stored in the journal volume according to the first embodiment of this invention;

FIG. 5 is a configuration diagram of the secondary volume management table stored in the journal volume according to the first embodiment of this invention;

FIG. 7 is a configuration diagram of the file update log table stored in the primary volume according to the first embodiment of this invention;

FIG. 8 is a configuration diagram of the file management table stored in the primary volume according to the first embodiment of this invention.

FIG. 9 illustrates a host computer-to-NAS device command list according to the first embodiment of this invention;

FIG. 10 illustrates an NAS device-to-disk device command list according to the first embodiment of this invention;

FIG. 19 illustrates a NAS device-to-disk device command list according to the second embodiment of this invention;

DETAILED DESCRIPTION OF THE PREFERRED EMBODIMENTS

Embodiments of this invention will be described below with reference to the accompanying drawings.

First Embodiment

Figure 1:
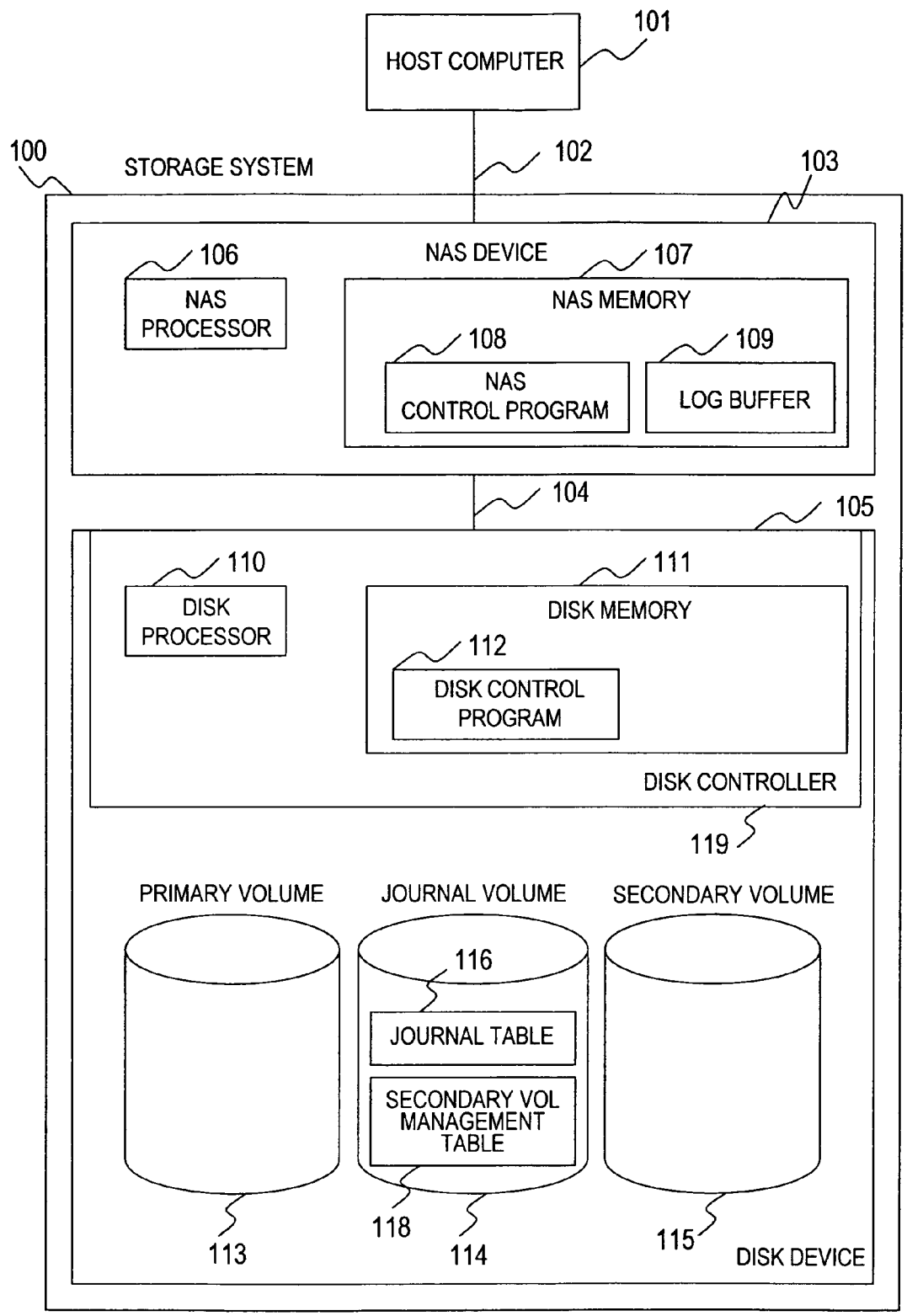
FIG. 1 is a block diagram showing the configuration of a storage system according to a first embodiment of this invention.

FIG. 1 is a block diagram showing the configuration of a storage system 100 according to a first embodiment of this invention.

The storage system 100 is connected to a host computer 101 via a network 102. The storage system 100 inputs and outputs data to and from a file in response to file input/output requests.

The storage system 100 has a NAS device 103 and a disk device 105, which are connected to each other via a Fibre Channel 104.

The NAS device 103 receives a file input/output request from the host computer 101, and converts the received file input/output request into a block input/output request. The NAS device 103 sends the block input/output request to the disk device 105.

The NAS device 103 has a NAS processor 106 and a NAS memory 107. The NAS processor 106 performs various kinds of processing by executing a program that is stored in the NAS memory 107.

The NAS memory 107 stores a program executed by the NAS processor 106, information needed by the NAS processor 106, and the like. Specifically, the NAS memory 107 stores a NAS control program 108. The NAS control program 108 receives a request from the host computer 101 and performs processing that fulfills the received request. Details of the NAS control program 108 will be described with reference to FIG. 2.

In a second embodiment, a part of the NAS memory 107 is used as a log buffer 109, which temporarily stores a current file update log table and a past file update log table. The file update log tables will be described later.

Functions of the NAS device 103 may be carried out by a disk controller 119 provided in the disk device 105. In this case, the storage system 100 does not need to have the NAS device 103.

The disk device 105 has the disk controller 119 and a physical disk. The disk controller 119 controls data input and output to and from the physical disk. The disk controller 119 provides the storage area of the physical disk as one or more logical volumes to the NAS device 103.

The disk controller 119 has a disk processor 110 and a disk memory 111. The disk processor 110 performs various kinds of processing by executing a program stored in the disk memory 111.

The disk memory 111 stores a program executed by the disk processor 110, information needed by the disk processor 110, and the like. Specifically, the disk memory 111 stores a disk control program 112. The disk control program 112 receives a request from the NAS device 103 and performs processing that fulfills the received request. Details of the disk control program 112 will be described with reference to FIG. 3.

The logical volumes include a primary volume 113, a journal volume 114 and a secondary volume 115. The explanatory diagram of FIG. 1 shows one primary volume 113, one journal volume 114 and one secondary volume 115, but the disk device 105 can have as many primary, journal, and secondary volumes as necessary.

The primary volume 113 stores, on a file-basis, data that is requested by the host computer 101 to be written. Data stored in the primary volume 113 is managed by a file system.

The secondary volume 115 stores a replication of data existing in the primary volume 113 at a specific point in time.

The journal volume 114 stores update data (journal data) written in the primary volume 113. Specifically, the journal volume 114 stores a journal table 116 and a secondary volume management table (secondary volume management table) 118.

The journal table 116 is used to manage update data written in the primary volume 113. Details of the journal table 116 will be described with reference to FIG. 4. The secondary volume management table 118 indicates at which point in time of the primary volume 113 replication data stored in the secondary volume 115 mirrors. Details of the secondary volume management table 118 will be described with reference to FIG. 5.

The disk controller 119 is capable of overwriting data that has been stored in the secondary volume 115 with a replication of data existing in the primary volume 113 at an arbitrary point between the time when the earliest update data held in the journal table 116 and the time when the latest update data held in the journal table 116.

Figure 2:
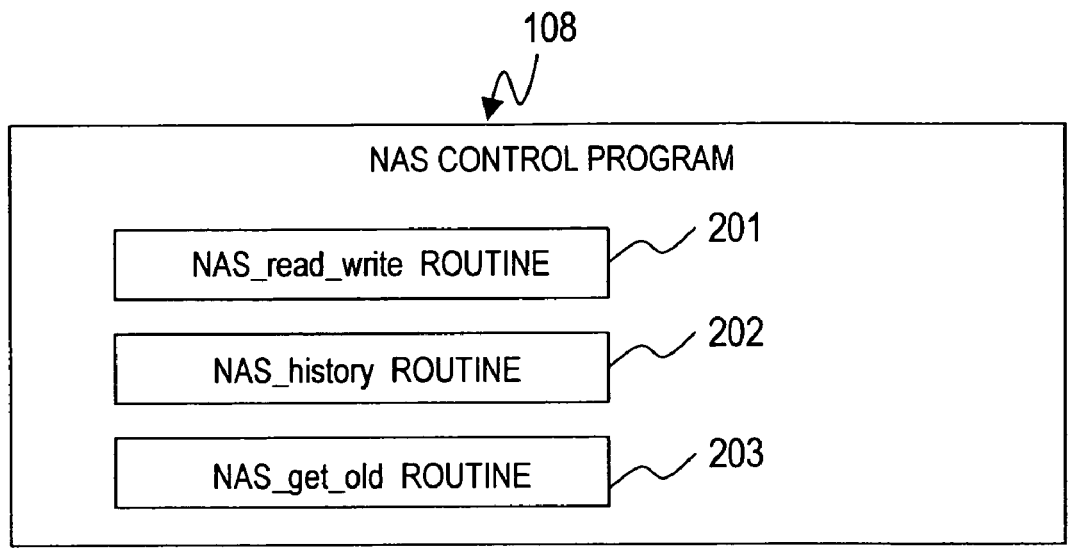
FIG. 2 is a block diagram of the NAS control program stored in the NAS device according to the first embodiment of this invention.

FIG. 2 is a block diagram of the NAS control program 108 stored in the NAS device 103 according to the first embodiment of this invention.

The NAS control program 108 contains a NAS_read_write routine 201, a NAS_history routine 202 and a NAS_get_old routine 203.

The NAS_read_write routine 201 receives a file input/output request from the host computer 101 and processes the received file input/output request. Details of the processing executed by the NAS_read_write routine 201 will be described with reference to FIG. 11.

The NAS_history routine 202 receives a file update point list obtaining request from the host computer 101, and processes the received file update point list obtaining request. Details of the processing executed by the NAS_history routine 202 will be described with reference to FIG. 12.

The NAS_get_old routine 203 receives a past file data obtaining request from the host computer 101, and processes the received past file data obtaining request. Details of the processing executed by the NAS_get_old routine 203 will be described with reference to FIG. 13.

Figure 3:
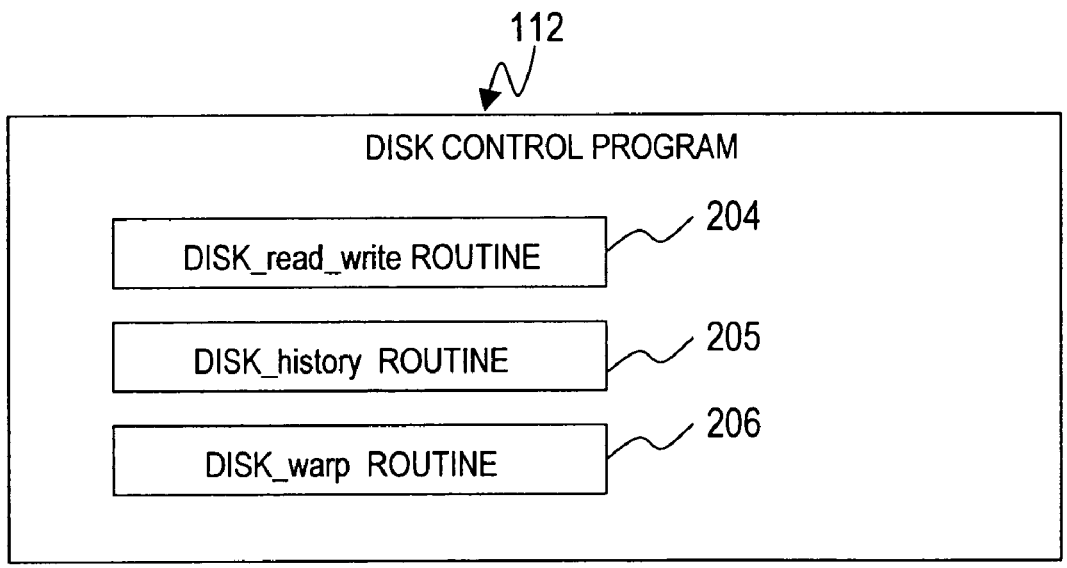
FIG. 3 is a block diagram of the disk control program stored in the disk device according to the first embodiment of this invention.

FIG. 3 is a block diagram of the disk control program 112 stored in the disk device 105 according to the first embodiment of this invention.

The disk control program 112 contains a DISK_read_write routine 204, a DISK_history routine 205 and a DISK_warp routine 206.

The DISK_read_write routine 204 receives a block input/output request from the NAS device 103 and processes the received block input/output request. Details of the processing executed by the DISK_read_write routine 204 will be described with reference to FIG. 14.

The DISK_history routine 205 receives a file update point list obtaining request from the NAS device 103, and processes the received block update point list obtaining request. Details of the processing executed by the DISK_history routine 205 will be described with reference to FIG. 15.

The DISK_warp routine 206 receives a request for creating a snap at a designated point in time from the NAS device 103, and processes the received request for creating a snap at a designated point in time. Details of the processing executed by the DISK_warp routine 206 will be described with reference to FIG. 16.

FIG. 4 is a configuration diagram of the journal table 116 stored in the journal volume 114 according to the first embodiment of this invention.

Each record held in the journal table 116 corresponds to update data of one update made to the primary volume 113. The journal table 116 contains a JID 301, a time 302, a block number 303, an FID 304, old data 305 and new data 306.

The JID 301 indicates an identifier unique to each round of processing of updating data stored in the primary volume 113. The time 302 indicates the time when update processing identified by the JID 301 of the record is performed. The block number 303 indicates a unique identifier for identifying which one of blocks contained in the primary volume 113 receives a data update through update processing identified by the JID 301 of the record.

The FID 304 indicates an identifier unique to a file in which data is updated through update processing identified by the JID 301 of the record in question. Journal tables according to conventional journal technologies do not have the FID 304.

The old data 305 indicates data that has been stored in a block identified by the block number 303 of the record in question immediately before update processing identified by the JID 301 of the record. The new data 306 indicates data that is stored in a block identified by the block number 303 of the record in question through update processing identified by the JID 301 of the record.

Update processing that is identified by a value "5001" of the JID 301 will be described here. The host computer 100 sends a file input/output request to the NAS device 103, requesting to read or write data from or to a file that is identified by a value "3" of the FID 304. Receiving the file input/output request, the NAS device 103 converts the received file input/output request into a block input/output request and sends the block input/output request created by the conversion to the disk device 105.

The disk device 105 receives the block input/output request and updates data in the primary volume 113 in accordance with the received block input/output request. Specifically, the disk device 105 updates data of a block contained in the primary volume 113 at "22:33:44.51" written as the time 302. The block in which data is updated through this update is identified by a value "101" of the block number 303. Immediately before the update processing, the block has stored data "0×101010 . . ." as indicated by the old data 305. After the update, the block stores data "0×111111 . . ." as indicated by the new data 306.

The journal table 116 is updated by the DISK_read_write routine 204. The journal table 116 is referred to by the DISK_history routine 205 and the DISK_warp routine 206. Specifically, the DISK_warp routine 206 refers to the journal table 116 to overwrite data stored in the secondary volume 115 with a replication of data existing in the primary volume 113 at an arbitrary point in time.

The journal table 116 according to this embodiment contains the FID 304 unlike journal tables according to conventional journal technologies. This enables the storage system 100 to extract only update points relevant to a specified file out of all update points held in the journal table 116.

FIG. 5 is a configuration diagram of the secondary volume management table 118 stored in the journal volume 114 according to the first embodiment of this invention.

The secondary volume management table 118 is composed of one record. The secondary volume management table 118 indicates at which point in time of the primary volume 113 replication data stored in the secondary volume 115 mirrors. The secondary volume management table 118 accordingly contains a JID 401 and a time 402.

The JID 401 indicates an identifier unique to update processing performed immediately before a time point at which replication data of the primary volume 113 is created to be stored in the secondary volume 115. The time 402 indicates the time when replication data of the primary volume 113 is created to be stored in the secondary volume 115.

In the explanatory diagram of FIG. 5, the secondary volume 115 stores a replication of data existing in the primary volume 113 that is at a point immediately after update processing identified by a value "5001" of the JID 401 is carried out. In other words, the secondary volume 115 stores a replication of data existing in the primary volume 113 at "22:33:44.51" as indicated by the time 402.

One secondary volume management table 118 corresponds to one secondary volume 115, which means that the disk device 105 stores as many secondary volume management tables 118 as the count of the secondary volumes 115 provided in the disk device 105.

The secondary volume management table 118 is updated and referred to by the DISK_warp routine 206. Specifically, the DISK_warp routine 206 refers to the secondary volume management table 118 to overwrite data stored in the secondary volume 115 with a replication of data existing in the primary volume 113 at an arbitrary point in time.

Figure 6:
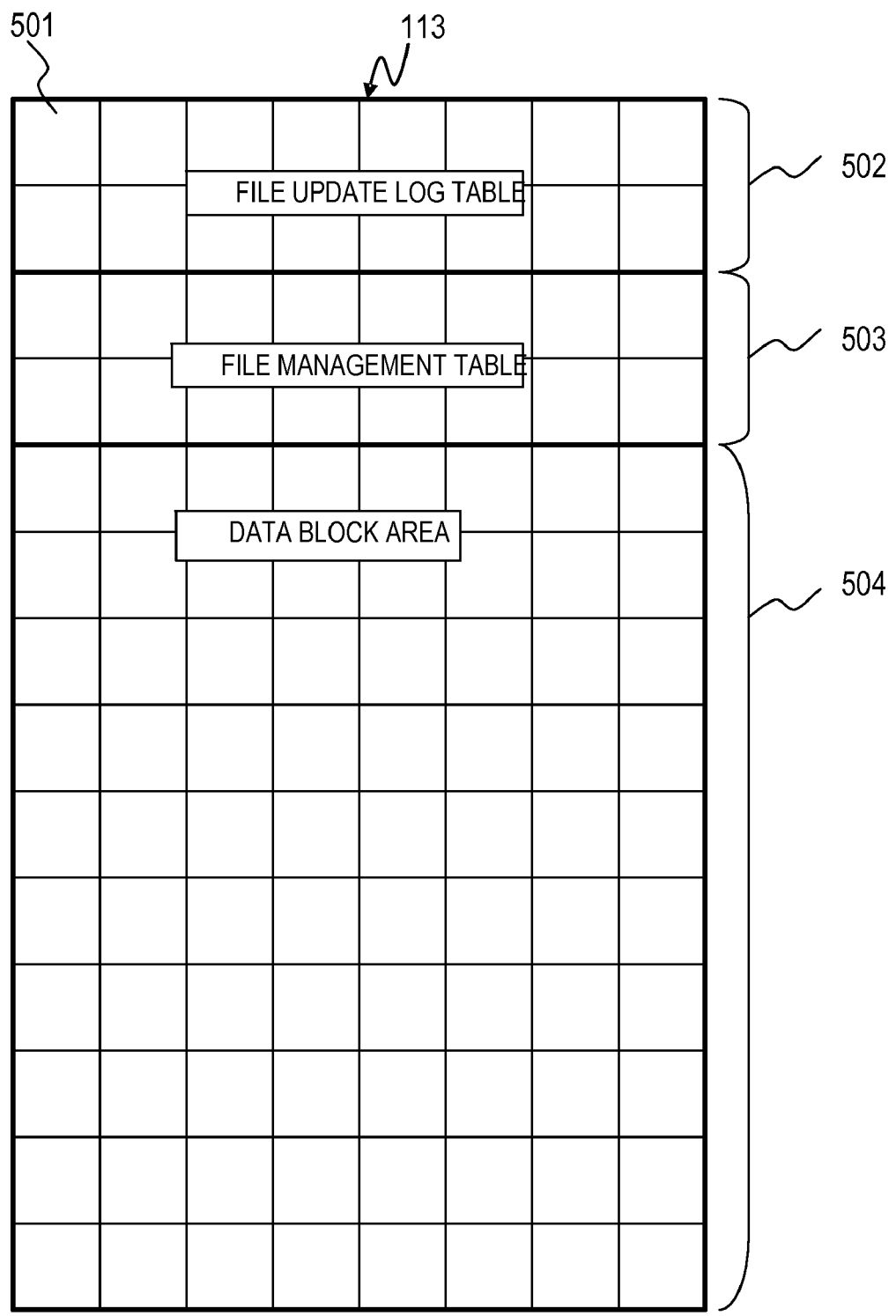
FIG. 6 is a block diagram showing the internal configuration of the primary volume according to the first embodiment of this invention.

FIG. 6 is a block diagram showing the internal configuration of the primary volume 113 according to the first embodiment of this invention.

Data stored in the primary volume 113 is managed by a file system. The primary volume 113 contains plural blocks 501. The blocks 501 each have a fixed length of 512 bytes.

The primary volume 113 contains a file update log table 502, a file management table 503 and a data block area 504.

The file update log table 502 is used to manage the history of data updates made to a file. The file update log table 502 is made up of, for example, 0th to 99th blocks. Details of the file update log table 502 will be described with reference to FIG. 7.

The file management table 503 indicates information about the configuration of a file. The file management table 503 is made up of, for example, 100th to 199th blocks. Details of the file management table 503 will be described with reference to FIG. 8.

The data block area 504 stores data constituting a file. The data block area 504 is made up of other blocks than those that constitute the file update log table 502 and the file management table 503.

The secondary volume 115, which stores a replication of data existing in the primary volume 113, has the same internal configuration as the primary volume 113. A description on the internal configuration of the secondary volume 115 will therefore be omitted.

FIG. 7 is a configuration diagram of the file update log table 502 stored in the primary volume 113 according to the first embodiment of this invention.

One record held in the file update log table 502 corresponds to one round of update processing performed on a file. The file update log table 502 contains an LID 601, a time 602, an FID 603 and a block number 604.

The LID 601 indicates an identifier unique to each round of update processing performed on a file. The time 602 indicates a time at which update processing identified by the LID 601 of the record in question is carried out. The FID 603 indicates an identifier unique to a file in which data is updated through update processing identified by the LID 601 of the record. The block number 604 indicates a unique identifier for identifying which one of blocks contained in the primary volume 113 receives a data update through update processing identified by the LID 601 of the record.

Update processing that is identified by a value "301" of the LID 601 will be described here. The host computer 101 sends a file input/output request to the NAS device 103, requesting to read or write data from or to a file that is identified by a value "3" of the FID 603. Receiving the file input/output request, the NAS device 103 converts the received file input/output request into a block input/output request. The NAS device 103 sends the block input/output request created by the conversion to the disk device 105 at "22:33:44.51" written as the time 602. The block input/output request requests for a data update of a block contained in the primary volume 113. The block in which data is updated as requested by the block input/output request is identified by a value "101" of the block number 604.

The file update log table 502 is updated by the NAS_read_write routine 201. Specifically, the NAS_read_write routine 201 adds a new record to the file update log table 502 each time data is written in a file.

FIG. 8 is a configuration diagram of the file management table 503 stored in the primary volume 113 according to the first embodiment of this invention.

One record contained in the file management table 503 corresponds to one file. The file management table 503 contains an FID 701, a file name 702, a block count 703 and a block list 704.

The FID 701 indicates an identifier unique to each file stored in the primary volume 113. The file name 702 indicates the name of a file that is identified by the FID 701 of the record in question. The block count 703 indicates how many blocks constitute a file that is identified by the FID 701 of the record in question.

The block list 704 indicates an identifier unique to a block that constitutes file identified by the FID 701 of the record in question. In other words, the block list 704 indicates an identifier unique to a block that stores data of a file identified by the FID 701 of the record in question. In the case of a file constituted of plural blocks, the identifiers of all the blocks constituting the file are stored as the block list 704.

A file identified by a value "1" of the FID 701 will be described here. The name of the file is "memo.txt" as indicated by the file name 702. The file is constituted of one block identified by a block number "50".

Described next are commands used in the first embodiment of this invention.

FIG. 9 illustrates a host computer-to-NAS device command list 801 according to the first embodiment of this invention.

The host computer-to-NAS device command list 801 indicates commands sent from the host computer 101 to the NAS device 103.

Commands sent from the host computer 101 to the NAS device 103 include a NAS_read_write command (a file input/output request), a NAS_history command (a file update point list obtaining request), and a NAS_get_old command (a past file data obtaining request).

A NAS_read_write command requests for read/write of data from/to a file. The host computer 101 sends, along with a NAS_read_write command, a read/write type, a file name, a start block number, and a block count to the NAS device 103. In the case of a NAS_read_write command that requests data write, the host computer 101 sends data to be written in addition to the above-mentioned information to the NAS device 103. In the case of a NAS_read_write command that requests data read, the NAS device 103 sends read data to the host computer 101.

The host computer 101 sends a read/write type to indicate whether it is read or write that the NAS_read_write command requests. A file name sent is the name of a file in which data is read or written as requested by the NAS_read_write command in question. A start block number is sent as an identifier unique to a head block of a range in which data is read or written as requested by the NAS_read_write command. A block count is sent to indicate how many blocks are in a range in which data is read or written as requested by the NAS_read_write command in question.

Write data sent by the host computer 101 is data to be written in the primary volume 113 as requested by the NAS_read_write command. Read data sent to the host computer 101 is data read out of the primary volume 113 as requested by the NAS_read_write command.

The NAS_read_write routine 201 processes NAS_read_write commands.

A NAS_history command requests the storage system 100 to obtain a list of update points relevant to a specified file. The host computer 101 sends a file name along with a NAS_history command to the NAS device 103. The NAS device 103 sends to the host computer 101 a list of update points relevant to a file that is identified by the received file name. A list of update points relevant to a file is, for example, a list of combinations of JID and time.

The NAS_history routine 202 processes NAS_history commands.

NAS_history command is one of features of this embodiment. The host computer 101 can obtain only update points relevant to a specified file, instead of all update points of the primary volume 113, by sending a NAS_history command. This makes it easier to identify a file restoration point.

A NAS_get_old command requests the storage system 100 to obtain past data of a file. The host computer 101 sends a file name and a JID along with a NAS_get_old command to the NAS device 103. The NAS device 103 obtains data existing in a file identified by the received file name at a time point associated with the received JID, and sends the obtained data to the host computer 101.

The NAS_get_Old routine 203 processes NAS_get_old commands.

FIG. 10 illustrates an NAS device-to-disk device command list 802 according to the first embodiment of this invention.

The NAS device-to-disk device command list 802 indicates commands sent from the NAS device 103 to the disk device 105.

Commands sent from the NAS device 103 to the disk device 105 include a DISK_read_write command (a block input/output request), a DISK_history command (a block update point list obtaining request), and a DISK_warp command (a request for creating a snap at a designated point in time).

A DISK_read_write command is a command which requests for read/write of data from/to a block. The NAS device 103 sends, along with a DISK_read_write command, a read/write type, a block number, and an FID to the disk device 105. In the case of a DISK_read_write command that requests data write, the NAS device 103 sends data to be written in addition to the above-mentioned information to the disk device 105. In the case of a DISK_read_write command that requests data read, the disk device 105 sends read data to the NAS device 103.

The NAS device 103 sends a read/write type to indicate whether it is read or write that the DISK_read_write command in question requests. A block number indicates an identifier unique to a block in which data is read or written as requested by the DISK_read_write command. An FID is sent as an identifier unique to a file in which data is read or written as requested by the DISK_read_write command.

Write data sent by the NAS device 103 is data to be written in the primary volume 113 as requested by the DISK_read_write command. Read data sent to the NAS device 103 is data read out of the primary volume 113 as requested by the DISK_read_write command.

The DISK_read_write routine 204 processes DISK_read_write commands.

The disk device 105 of this embodiment receives an FID, which is file level information, along with a DISK_read_write command, which is a block level request. This enables the disk device 105 to create and update the journal table 116 containing the FID 304.

A DISK_history command is a command which requests the storage system 100 to obtain a list of update points relevant to a specified file. The NAS device 103 sends an FID along with a DISK_history command to the disk device 105. The disk device 105 sends to the NAS device 103 a list of update points relevant to a file that is identified by the received FID. A list of update points relevant to a file is, for example, a list of combinations of JID and time.

The DISK_history routine 205 processes DISK_history commands.

The disk device 105 of this embodiment receives an FID, which is file level information, along with a DISK_history command, which is a block level request. This enables the disk device 105 to identify which of update points in the journal table 116 containing the FID 304 are relevant to a file that is identified by the received FID.

A DISK_warp command is a command which requests the storage system 100 to overwrite data stored in the secondary volume 115 with a replication of data executing in the primary volume 113 at a designated point in time. The NAS device 103 sends a JID along with a DISK_warp command to the disk device 105.

The DISK_warp routine 206 processes DISK_warp commands.

Figure 11:
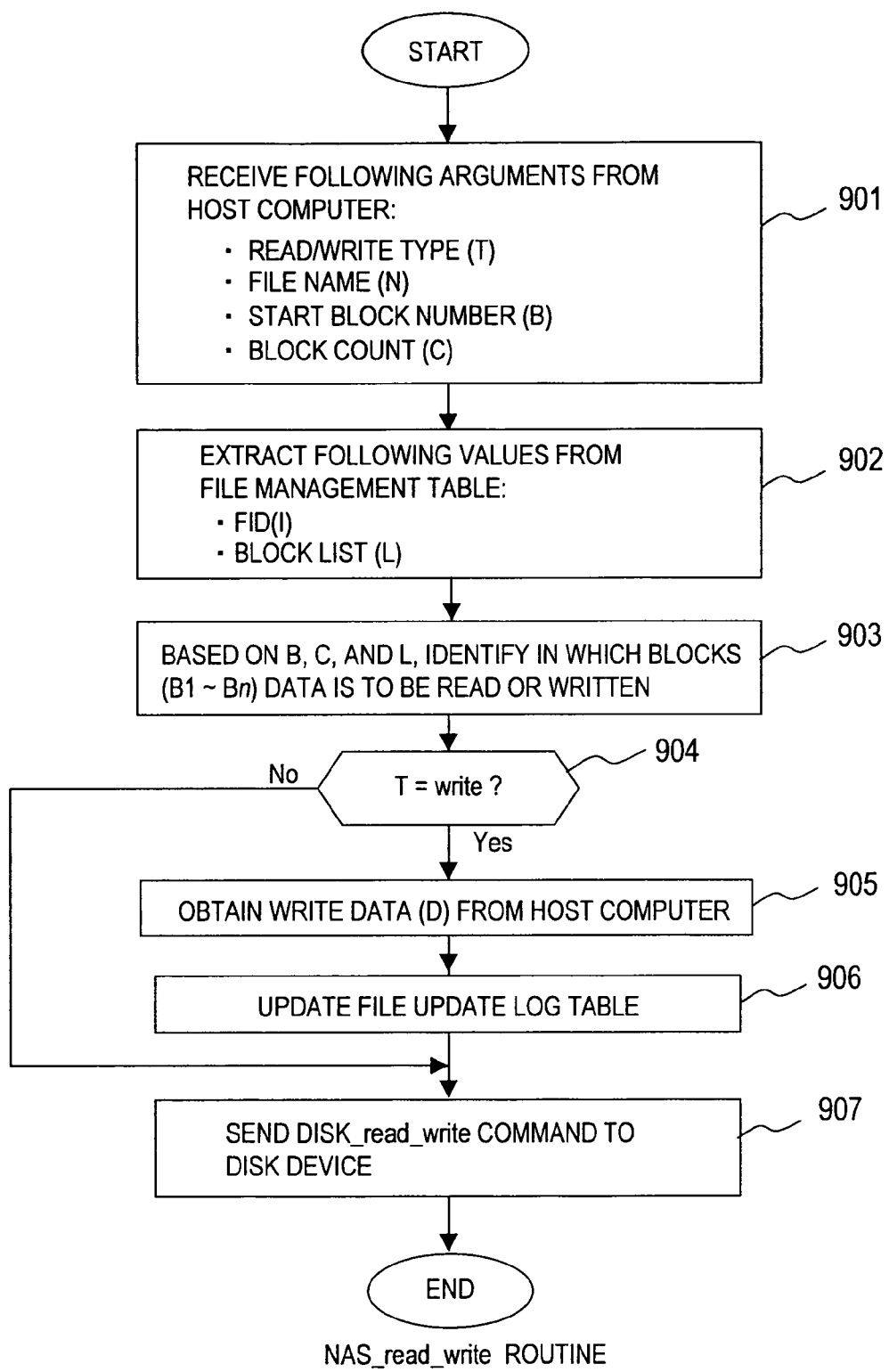
FIG. 11 is a flow chart of the NAS_read_write routine which is executed by the NAS device according to the first embodiment of this invention.

FIG. 11 is a flow chart of the NAS_read_write routine 201 which is executed by the NAS device 103 according to the first embodiment of this invention.

The NAS device 103 cooperates with the disk device 105 to process, through the NAS_read_write routine 201, a NAS_read_write command received from the host computer 101.

The NAS device 103 first receives a read/write type (T), a file name (N), a start block number (B) and a block count (C) from the host computer 101 (901).

Next, the NAS device 103 chooses from the file management table 503 a record whose file name 702 matches the received file name. The NAS device 103 extracts the FID (I) 701 and the block list (L) 704 from the chosen record (902).

Based on the received start block number, the received block count, and the extracted block list 704, the NAS device 103 identifies a set of block numbers (B1 to Bn) assigned to read/write target blocks as requested by the received NAS_read_write command (903). The set of block numbers of read/write target blocks is made up of block numbers in the extracted block list 704 that are between, and including, the received start block number and a block number counted up from the received start block number by the received block count.

The NAS device 103 next judges whether or not the received read/write type indicates data write (904). When the received read/write type indicates data read, the NAS device 103 does not need to update the file update log table 502. The NAS device 103 therefore proceeds directly to Step 907.

On the other hand, when the received read/write type indicates data write, the NAS device 103 receives write data (D) from the host computer 101 (905). The NAS device 103 then updates the file update log table 502 (906).

Specifically, the NAS device 103 chooses in order the block numbers included in the set of block numbers of read/write target blocks that has been identified in Step 903.

The NAS device 103 performs the following processing on each block number chosen. First, the NAS device 103 creates a new record in the file update log table 502. As the LID 601 of the newly created record, the NAS device 103 sets a value that does not overlap with the LID 601 of any existing record. The NAS device 103 next sets the current time as the time 602 of the newly created record. As the FID 603 of the newly created record, the NAS device 103 sets the FID 701 extracted in Step 902. The NAS device 103 next sets the chosen block number as the block number 604 of the newly created record.

The NAS device 103 thus creates records correspond to update processing performed on blocks that are identified by the chosen block numbers in the file update log table 502. The NAS device 103 repeats this processing until every block number included in the identified set of block numbers of read/write target blocks is chosen. In this way the NAS device 103 updates the file update log table 502.

Next, the NAS device 103 converts the NAS_read_write command received from the host computer 101 into a DISK_read_write command. The NAS device 103 sends the DISK_read_write command created by the conversion to the disk device 105, to thereby read or write data (907).

Specifically, the NAS device 103 chooses in order the block numbers included in the set of block numbers of read/write target blocks that has been identified in Step 903. The NAS device 103 creates a DISK_read_write command for each block number chosen, and sends the created DISK_read_write command to the disk device 105. Along with the DISK_read_write command, the NAS device 103 sends the received read/write type, the chosen block number, and the extracted FID 701 to the disk device 105.

In the case where the received read/write type indicates data write, the NAS device 103 sends data to be written in addition to the above-mentioned information to the disk device 105. The NAS device 103 then ends the processing of the NAS_read_write routine 201.

In the case where the received read/write type indicates data read, the NAS device 103 receives read data from the disk device 105, and sends the received read data to the host computer 101. The NAS device 103 then ends the NAS_read_write routine 201.

As described above, when it is write processing, the NAS device 103 sends an FID which is an identifier unique to a file to the disk device 105 through the NAS_read_write routine 201.

Figure 12:
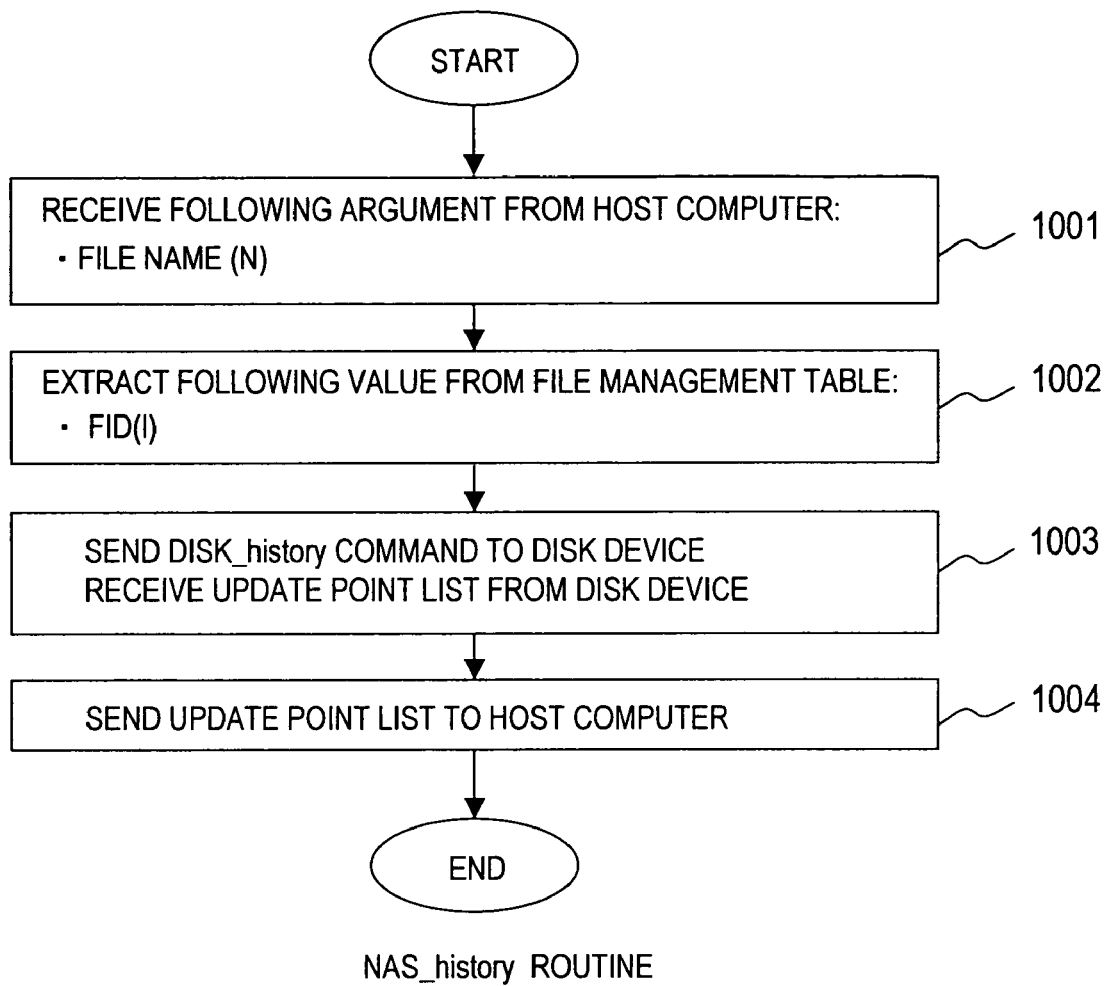
FIG. 12 is a flow chart of the NAS_history routine which is executed by the NAS device according to the first embodiment of this invention.

FIG. 12 is a flow chart of the NAS_history routine 202 which is executed by the NAS device 103 according to the first embodiment of this invention.

The NAS device 103 cooperates with the disk device 105 to process, through the NAS_history routine 202, a NAS_history command received from the host computer 101.

First, the NAS device 103 receives a file name (N) from the host computer 101 (1001). The NAS device 103 next chooses from the file management table 503 a record whose fine name 702 matches the received file name. The NAS device 103 extracts the FID 701 from the chosen record (1002).

The NAS device 103 sends a DISK_history command along with the extracted FID 701 to the disk device 105. In response, the disk device 105 sends a list of updated points to the NAS device 103 (1003). This list of update points is about a file identified by the file name received in Step 1001, and lists up combinations of JID and time.

The NAS device 103 sends the received list of update points to the host computer 101 (1004). The NAS device 103 then ends the NAS_history routine 202.

The host computer 101 can thus obtain a list of update points relevant to a specified file. The host computer 101 displays the received list of update points. Thereafter, the host computer 101 accepts designation of one of update points in the displayed list. The host computer 101 sends a NAS_get_old command to the NAS device 103 along with a JID that is associated with the designated update point and the name of a file whose data is requested to be obtained. The host computer 101 can thus obtain data at a designated update point of a specified file.

Instead of the host computer 101, the NAS device 103 or the disk device 105 may automatically choose one update point from a list of update points. For instance, the NAS device 103 or the disk device 105 chooses the latest update point from a list of update points. Then the disk device 105 executes the DISK_warp routine 206, to thereby restore file data to the update point chosen by the NAS device 103 or the disk device 105. The data of the file at the update point chosen by the NAS device 103 or the disk device 105 is sent by the disk device 105 to the host computer 101 via the NAS device 103.

Figure 13:
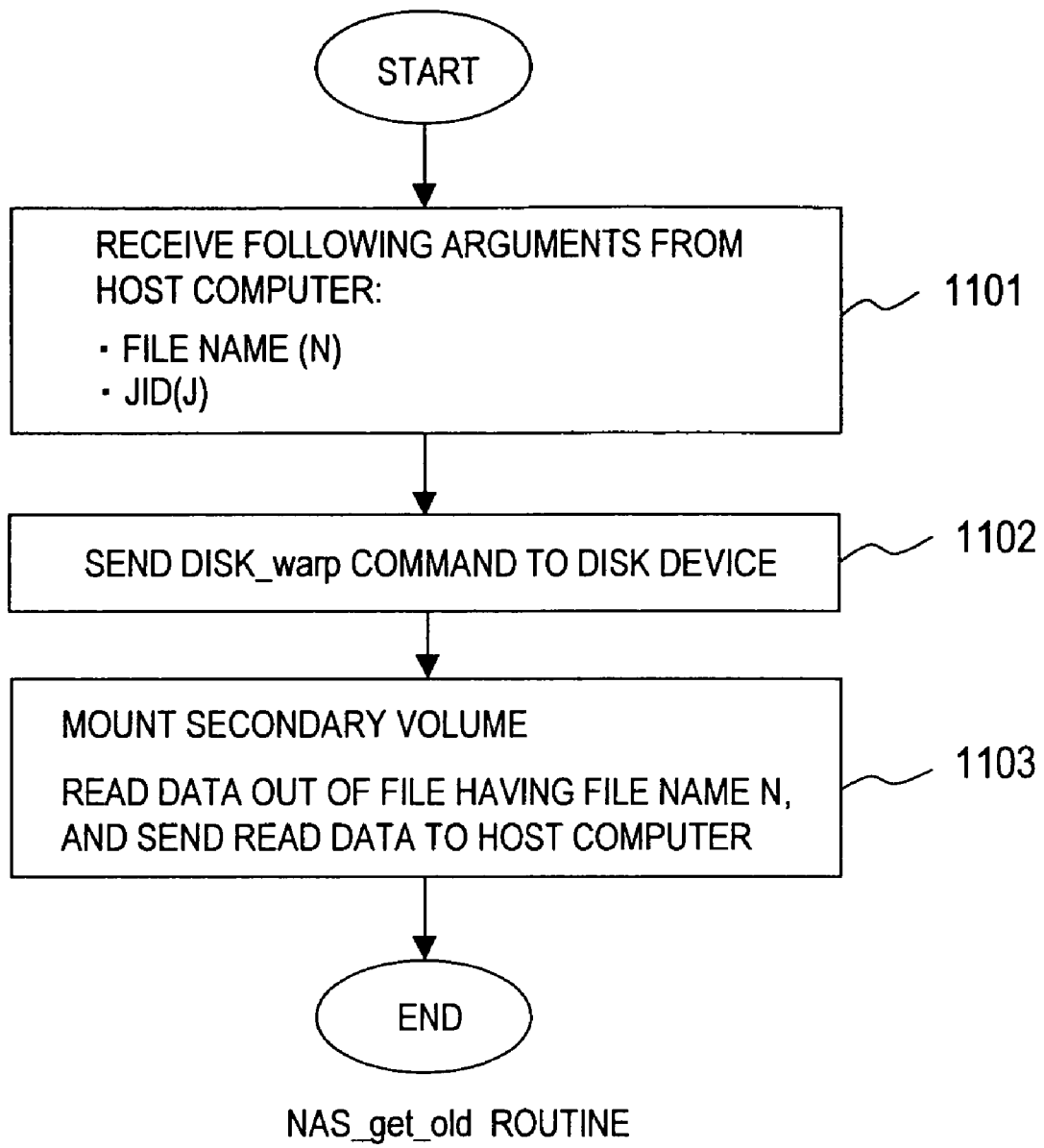
FIG. 13 is a flow chart of the NAS_get_old routine which is executed by the NAS device according to the first embodiment of this invention.

FIG. 13 is a flow chart of the NAS_get_old routine 203 which is executed by the NAS device 103 according to the first embodiment of this invention.

The NAS device 103 cooperates with the disk device 105 to process, through the NAS_get_old routine 203, a NAS_get_old command received from the host computer 101.

First, the NAS device 103 receives a file name (N) and a JID (J) from the host computer 101 (1101). The NAS device 103 sends a DISK_warp command along with the received JID to the disk device 105 (1102). The disk device 105 executes the DISK_warp routine 206 in response. In this manner, the disk device 105 overwrites data stored in the secondary volume 115 with a replication of data existing in the primary volume 113 at a time point associated with the received JID.

Next, the NAS device 103 mounts the secondary volume 115. The NAS device 103 reads out of the mounted secondary volume 115 data of a file that is identified by the received file name. The NAS device 103 sends the read data to the host computer 101 (1103). The NAS device 103 then ends the NAS_get_old routine 203.

As described above, the NAS_get_old routine 203 enables the NAS device 103 to send a file at a point designated by the host computer 101 to the host computer 101.

Figure 14:
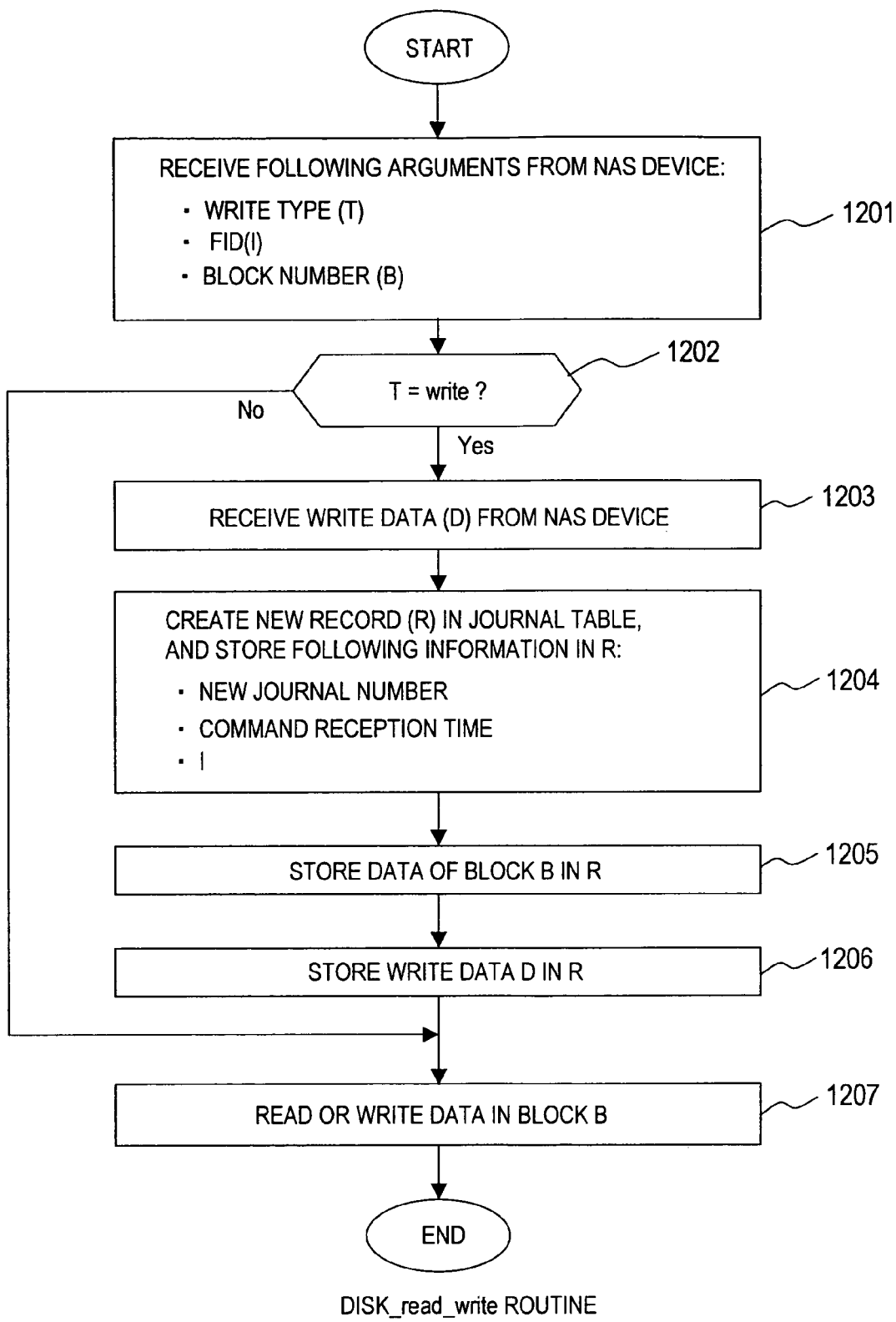
FIG. 14 is a flow chart of the DISK_read_write routine which is executed by the disk device according to the first embodiment of this invention.

FIG. 14 is a flow chart of the DISK_read_write routine 204 which is executed by the disk device 105 according to the first embodiment of this invention.

The disk device 105 processes, through the DISK_read_write routine 204, a DISK_read_write command received from the NAS device 103.

The disk device 105 receives a read/write type (T), an FID (I), and a block number (B) from the NAS device 103 (1201). The disk device 105 next judges whether or not the received read/write type indicates data write (1202). When the received read/write type indicates data read, the disk device 105 does not need to update the journal table 116. The disk device 105 therefore proceeds directly to Step 1207.

On the other hand, when the received read/write type indicates data write, the disk device 105 receives write data (D) from the NAS device 103 (1203). The disk device 105 then updates the journal table 116.

Specifically, the disk device 105 creates a new record (R) in the journal table 116. As the JID 301 of the newly created record, the disk device 105 sets a value that does not overlap with the JID 301 of any existing record. The disk device 105 next sets the time when the DISK_read_write command is received as the time 302 of the newly created record. The disk device 105 sets the received block number as the block number 303 of the newly created record. As the FID 304 of the newly created record, the disk device 105 sets the received FID (1204).

The disk device 105 enters data stored in a block that is identified by the received block number as the old data 305 of the newly created record (1205). As the new data 306 of the newly created record, the disk device 105 enters the received write data (1206). The disk device 105 thus updates the journal table 116.

Next, the disk device 105 reads or writes data from or to the block identified by the received block number (1207).

Specifically, in the case where the received read/write type indicates data read, the disk device 105 reads data out of the block identified by the received block number. The disk device 105 sends the read data to the NAS device 103. The disk device 105 then ends the DISK_read_write routine 204.

In the case where the received read/write type indicates data write, the disk device 105 writes the received write data in the block identified by the received block number. The disk device 105 then ends the DISK_read_write routine 204.

As described above, the DISK_read_write routine 204 enables the disk device 105 to update the journal table 116, which holds file identifiers, and at the same time input and output data to and from a block.

Figure 15:
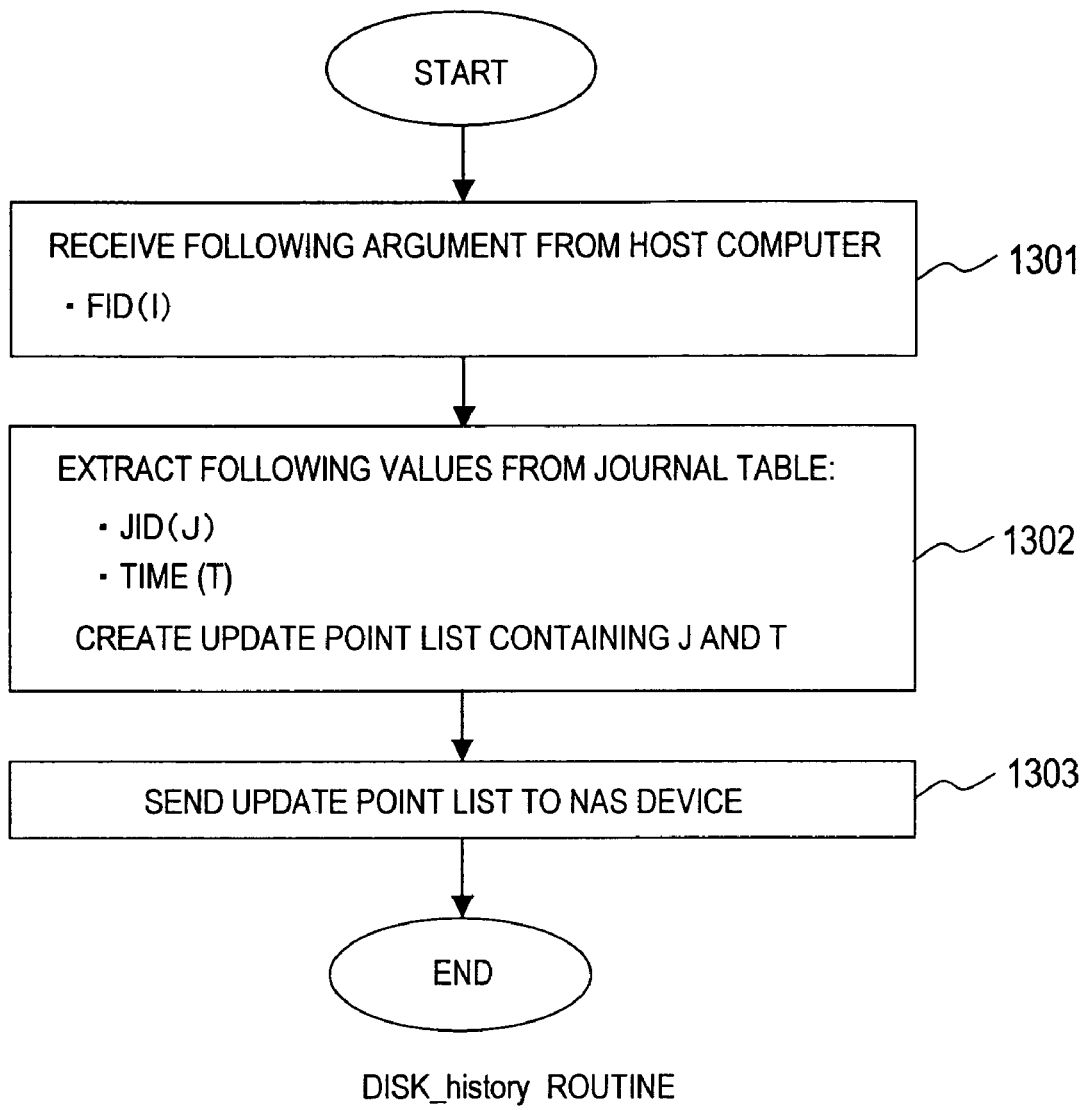
FIG. 15 is a flow chart of the DISK_history routine which is executed by the disk device according to the first embodiment of this invention.

FIG. 15 is a flow chart of the DISK_history routine 205 which is executed by the disk device 105 according to the first embodiment of this invention.

The disk device 105 processes, through the DISK_history routine 205, a DISK_history command received from the NAS device 103.

First, the disk device 105 receives an FID (I) from the NAS device 103 (1301).

The disk device 105 next chooses from the journal table 116 every record whose FID 304 matches the received FID. From the chosen record, the disk device 105 extracts the JID (J) 301 and the time (T) 302. The disk device 105 pairs up the JID 301 and the time 302 that are extracted from the same record, and thus creates a list of update points (1302).

The disk device 105 sends the created list of update points to the NAS device 103 (1303), whereby ending the DISK_history routine 205.

As described above, the DISK_history routine 205 enables the disk device 105 to extract all update points relevant to a specific file from the journal table 116 by scanning the journal table 116 only once. The disk device 105 can therefore process a DISK_history command quickly. This is owing to the fact that the journal table 116 contains the FID 304.

Figure 16:
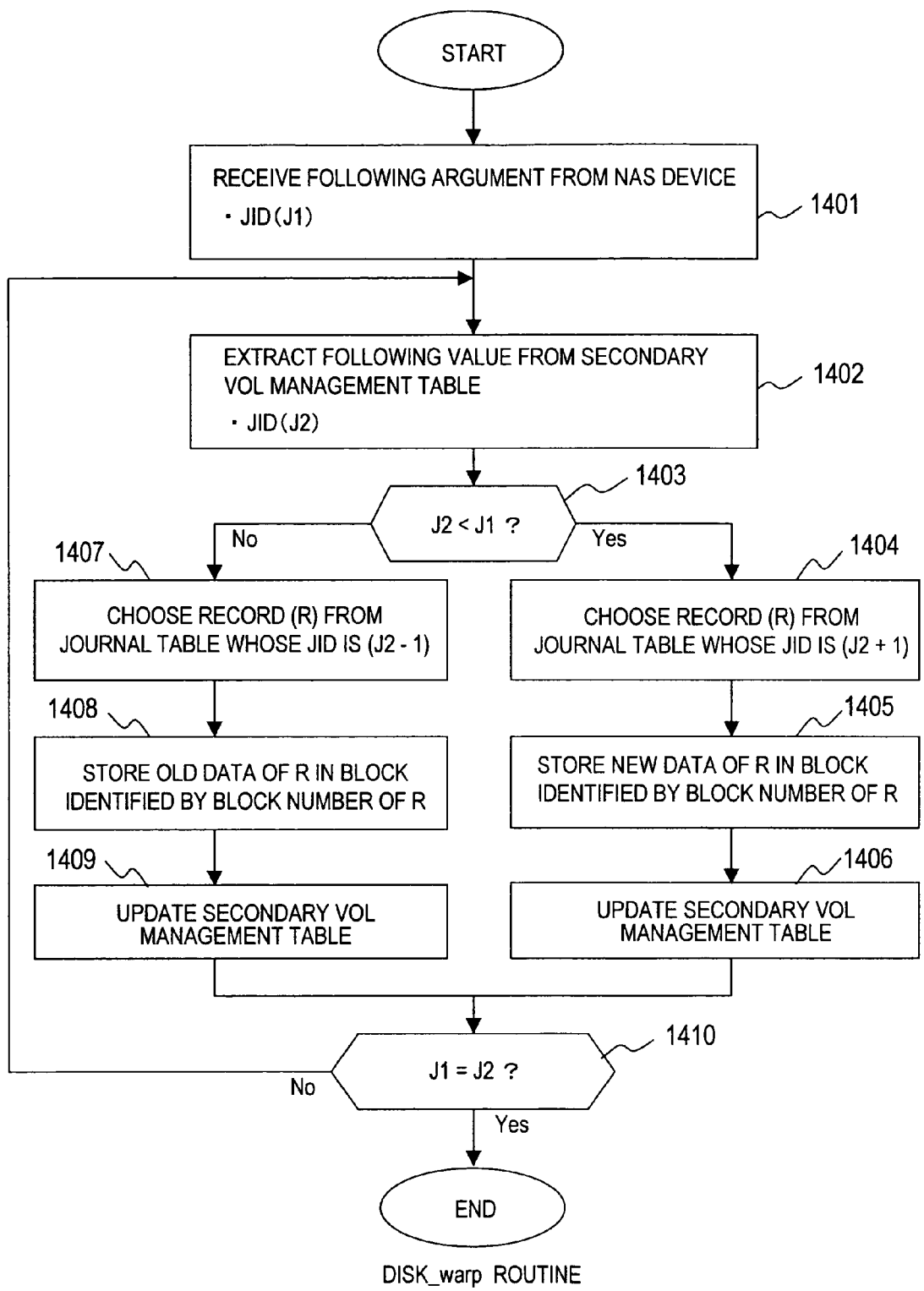
FIG. 16 is a flow chart of the DISK_warp routine which is executed by the disk device according to the first embodiment of this invention.

FIG. 16 is a flow chart of the DISK_warp routine 206 which is executed by the disk device 105 according to the first embodiment of this invention.

The disk device 105 processes, through the DISK_warp routine 206, a DISK warp command received from the NAS device 103.

First, the disk device 105 receives a JID (J1) from the NAS device 103 (1401). The disk device 105 next extracts the JID (J2) 401 from the secondary volume management table 118 (1402).

Next, the disk device 105 judges whether or not the JID received from the NAS device 103 is larger than the JID 401 extracted from the secondary volume management table 118 (1403).

When the JID received from the NAS device 103 is larger than the JID 401 extracted from the secondary volume management table 118, the disk device 105 replaces data stored in the secondary volume 115 with newer data.

Specifically, the disk device 105 adds "1" to the JID 401 extracted from the secondary volume management table 118. The disk device 105 then chooses from the journal table 116 a record (R) whose JID 301 matches the value obtained by the addition (1404).

From the chosen record, the disk device 105 extracts the time 302, the block number 303 and the new data 306. The disk device 105 next stores the extracted new data 306 in a block identified by the extracted block number 303 (1405). The disk device 105 thus replaces data stored in the secondary volume 115 with newer data that is ahead in time by one round of update processing.

The disk device 105 next updates the secondary volume management table 118 (1409). Specifically, the disk device 105 adds "1" to the JID 401 of the secondary volume management table 118. The disk device 105 also enters the extracted time 302 as the time 402 of the secondary volume management table 118 (1406).

The disk device 105 then judges whether or not the JID received from the NAS device 103 is the same as the JID 401 of the secondary volume management table 118 (1410).

When the JID received from the NAS device 103 is the same as the JID 401 of the secondary volume management table 118, it means that data to be stored in the secondary volume 115 is a replication of data existing in the primary volume 113 that at a time point associated with the JID received from the NAS device 103. Then the disk device 105 ends the DISK_warp routine 206.

On the other hand, when the JID received from the NAS device 103 is different from the JID 401 of the secondary volume management table 118, it means that data to be stored in the secondary volume 115 is not a replication of data existing in the primary volume 113 at a time point associated with the JID received from the NAS device 103. Then the disk device 105 returns to Step 1402 to repeat the processing.

In the case where it is judged in Step 1403 that the JID received from the NAS device 103 is equal to or smaller than the JID 401 extracted from the secondary volume management table 118, the disk device 105 replaces data stored in the secondary volume 115 with older data.

Specifically, the disk device 105 subtracts "1" from the JID 401 extracted from the secondary volume management table 118. The disk device 105 then chooses from the journal table 116 a record (R) whose JID 301 matches the value obtained by the subtraction (1407).

From the chosen record, the disk device 105 extracts the time 302, the block number 303 and the old data 305. The disk device 105 next stores the extracted old data 305 in a block identified by the extracted block number 303 (1408). The disk device 105 thus replaces data stored in the secondary volume 115 with older data that is behind in time by one round of update processing.

The disk device 105 next updates the secondary volume management table 118 (1409). Specifically, the disk device 105 adds "1" to the JID 401 of the secondary volume management table 118. The disk device 105 also enters the extracted time 302 as the time 402 of the secondary volume management table 118 (1406).

The disk device 105 then judges whether or not the JID received from the NAS device 103 is the same as the JID 401 of the secondary volume management table 118 (1410).

When the JID received from the NAS device 103 is the same as the JID 401 of the secondary volume management table 118, it means that data to be stored in the secondary volume 115 is a replication of data existing in the primary volume 113 at a time point associated with the JID received from the NAS device 103. Then the disk device 105 ends the DISK_warp routine 206.

On the other hand, when the JID received from the NAS device 103 is different from the JID 401 of the secondary volume management table 118, it means that data to be stored in the secondary volume 115 is not a replication of data existing in the primary volume 113 at a time point associated with the JID received from the NAS device 103. Then the disk device 105 returns to Step 1402 to repeat the processing.

As described above, the DISK_warp routine 206 executes a lot of phisical disk input/outputs and the disk device 105 accordingly takes a long time to finish executing the routine.

In the case where a file restored to some update point is found to be of no use, restoration of the file to another update point is carried out. To perform such a repetitive job on the block level as in prior art, the job is repeated as many times as the count of block level update points, at maximum. Block level update points include not only update points relevant to a target file but also update points irrelevant to the target file.

In contrast, the repetitive job performed in this embodiment is on the file level. The repetitive job is therefore performed, at most, as many times as the count of update points relevant to a target file, and data can be restored efficiently.

Second Embodiment

A second embodiment of this invention uses the file update log table 502 in place of the journal table 116.

The storage system 100 according to the second embodiment of this invention has the same configuration as the storage system of the first embodiment shown in FIG. 1, except for the NAS control program 108 stored in the NAS memory 107 and the disk control program 112 stored in the disk memory 111. A detailed description on the configuration of the storage system 100 of the second embodiment will therefore be omitted. Also, the storage system 100 of the second embodiment performs the same processing as the one in the first embodiment, except for processing that will be described later. The description on processing that has been given in the first embodiment will not be repeated here.

In this embodiment, the size of each record held in the file update log table 502 is equal to the block size, 512 bytes.

Figure 17:
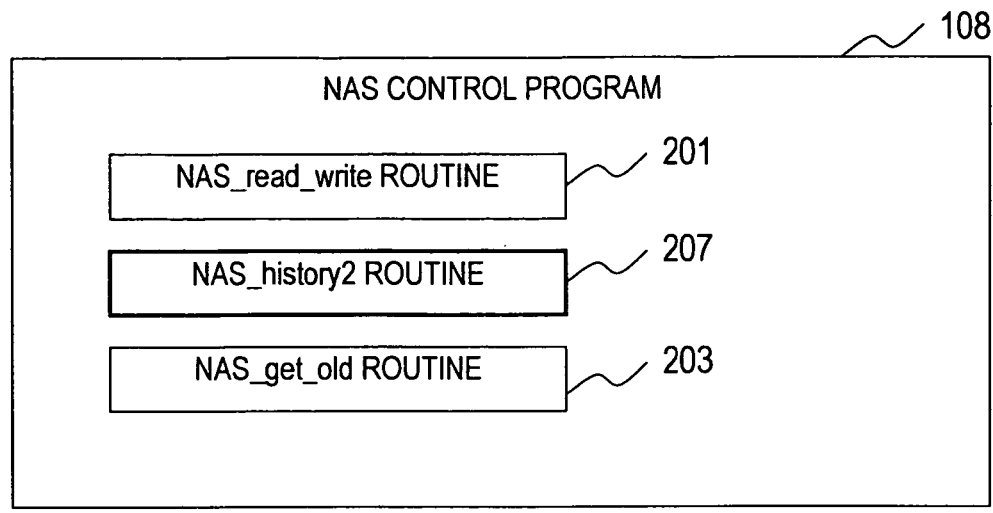
FIG. 17 is a block diagram of the NAS control program stored in the NAS device according to the second embodiment of this invention.

FIG. 17 is a block diagram of the NAS control program 108 stored in the NAS device 103 according to the second embodiment of this invention.

The NAS control program 108 contains the NAS_read_write routine 201, a NAS_history2 routine 207 and the NAS_get_old routine 203. The NAS_read_write routine 201 and the NAS_get_old routine 203 are the same as those contained in the NAS control program 108 of the first embodiment, and descriptions thereof will be omitted.

The NAS_history2 routine 207 receives from the host computer 101 a file update point list obtaining request (a NAS_history command), and processes the received file update point list obtaining request. Details of the processing executed by the NAS_history2 routine 207 will be described with reference to FIG. 20.

Figure 18:
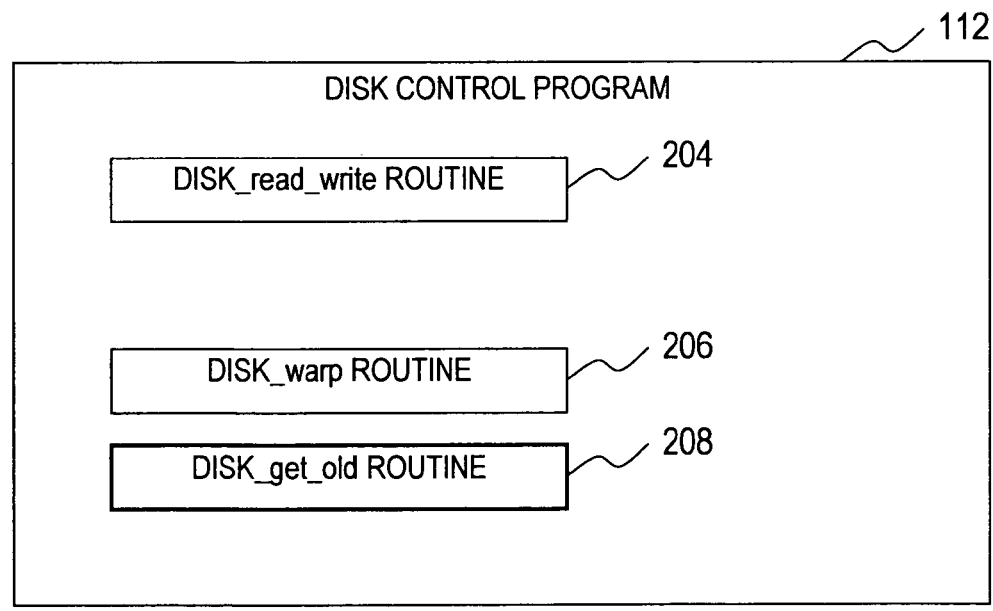
FIG. 18 is a block diagram of the disk control program stored in the disk device according to the second embodiment of this invention.

FIG. 18 is a block diagram of the disk control program 112 stored in the disk device 105 according to the second embodiment of this invention.

The disk control program 112 contains the DISK_read_write routine 204, a DISK_warp routine 206 and a DISK_get_old routine 208. The DISK_read_write routine 204 and the DISK_warp routine 206 are the same as those contained in the disk control program 112 of the first embodiment, and descriptions thereof will be omitted.

The DISK_get_old routine 208 receives from the NAS device 103 a past block information obtaining request (a DISK_get_old command), and processes the received past block information obtaining request. Details of the processing executed by the DISK_get_old routine 208 will be described with reference to FIG. 21.

FIG. 19 illustrates a NAS device-to-disk device command list 803 according to the second embodiment of this invention.

The NAS device-to-disk device command list 803 indicates commands sent from the NAS device 103 to the disk device 105.

Commands sent from the NAS device 103 to the disk device 105 include a DISK_read_write command (a block input/output request), a DISK_warp command (a request for creating a snap at a designated point in time), and a DISK_get_ Old command (a past block information obtaining request). The second embodiment employs the same DISK_read_write command and DISK_warp command as those in the first embodiment, and descriptions thereof will be omitted.

A DISK_get_old command requests the storage system 100 to obtain past data stored in a block. The NAS device 103 sends a head block number and a tail block number to the disk device 105 along with a DISK_get_old command. In response, the disk device 105 sends to the NAS device 103 past data stored in blocks between and including a block that has the received head block number and a block that has the received tail block number.

A DISK_get_old routine 208 processes DISK_get_old commands.

Figure 20:
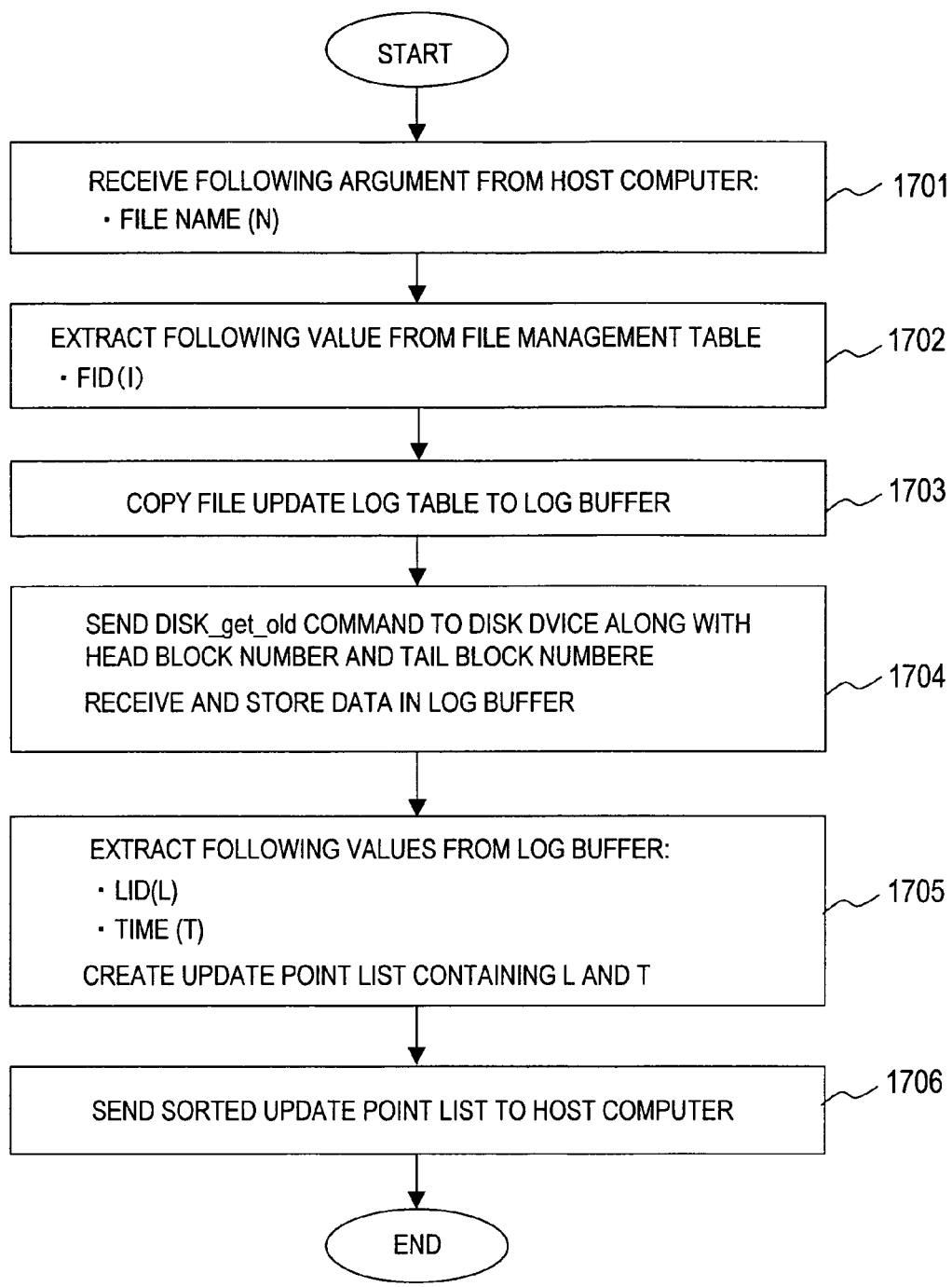
FIG. 20 is a flow chart of the NAS_history2 routine which is executed by the NAS device according to the second embodiment of this invention.

FIG. 20 is a flow chart of the NAS_history2 routine 207 which is executed by the NAS device 103 according to the second embodiment of this invention.

The NAS device 103 cooperates with the disk device 105 to process, through the NAS_history2 routine 207, a NAS_history command received from the host computer 101.

First, the NAS device 103 receives a file name (N) from the host computer 101 (1701). The NAS device 103 next chooses from the file management table 503 a record whose fine name 702 matches the received file name. The NAS device 103 extracts the FID 701 from the chosen record (1702).

Next, the NAS device 103 stores a copy of the file update log table 502 in the log buffer 109 (1703), thereby storing information about immediate update points in the log buffer 109.

The NAS device 103 then identifies a head block number and a tail block number of blocks where the file update log table 502 is stored. In the case where the file update log table 502 is made up of 0th to 99th blocks, the NAS device 103 identifies "0" as the head block number and "99" as the tail block number.

The NAS device 103 sends a DISK_get_old command to the disk device 105 along with the identified head block number and tail block number. In response, the disk device 105 sends to the NAS device 103 past data stored in blocks between and including a block that has the received head block number and a block that has the received tail block number. The NAS device 103 stores the received past data in the log buffer 109 (1704). This past data is the past file update log table 502. The log buffer 109 thus stores snaps of the file update log table 502 over the entire journal period.

Next, the NAS device 103 chooses, from the file update log table 502 stored in the log buffer 109, every record whose FID 603 matches the extracted FID 701. From the record chosen, the NAS device 103 extracts the LID 601 and the time 602. The NAS device 103 pairs up the LID 601 and the time 602 that are extracted from the same record, and thus creates a list of update points (1705). The update point list created by the NAS device 103 is sorted by the order of the LID 601 or the time 602.

The NAS device 103 sends the created list of update points to the host computer 101 (1706), whereby ending the NAS_history2 routine 207.

In the NAS_history routine 202 of the first embodiment, the NAS device 103 obtains update points from the journal table 116. In the NAS_history2 routine 207, on the other hand, the NAS device 103 obtains update points from the file update log table 502.

However, the NAS device 103 can only obtain immediate update points in this case, because the file update log table 502 is a table used to recover an update that is being processed when a system failure occurs and accordingly is allocated a small area. In other words, information about an update point is cyclically overwritten in each record of the file update log table 502.

Meanwhile, the past file update log table 502 is kept in the journal table 116. The NAS device 103 can obtain the past file update log table 502 from the journal table 116. Therefore, in the NAS_history2 routine 207, the NAS device 103 stores the current file update log table 502 and the past file update log table 502 in the log buffer 109. The NAS device 103 can thus create the whole file update log table 502 that covers the entire journal period.

Figure 21:
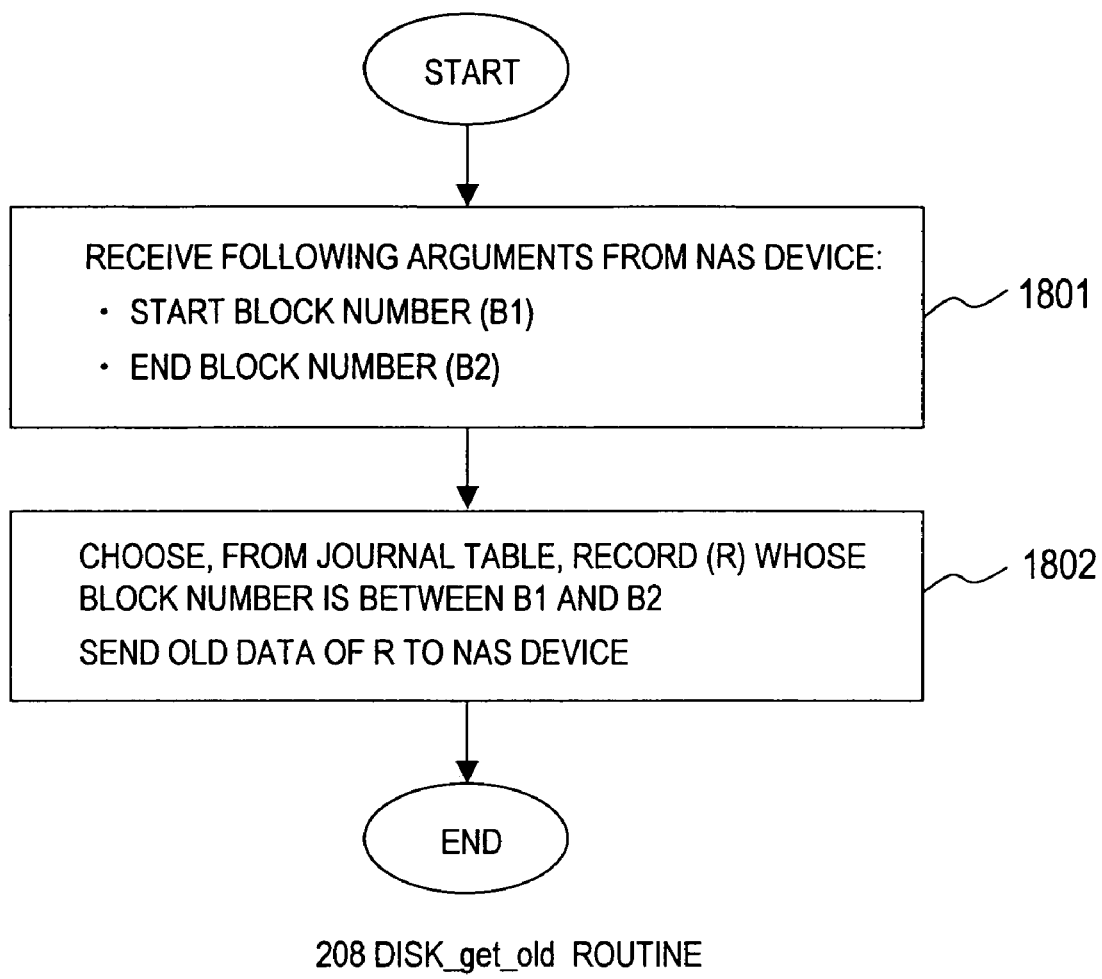
FIG. 21 is a flow chart of the DISK_get_old routine which is executed by the disk device according to the second embodiment of this invention.

FIG. 21 is a flow chart of the DISK_get_old routine 208 which is executed by the disk device 105 according to the second embodiment of this invention.

The disk device 105 processes, through the DISK_get_old routine 208, a DISK_get_old command received from the NAS device 103.

First, the disk device 105 receives a start block number (B1) and an end block number (B2) from the NAS device 103 (1801).

The disk device 105 next chooses from the journal table 116 every record whose block number 303 is equal to or larger than the received start block number and equal to or smaller than the received end block number. From the record chosen, the disk device 105 extracts the old data 305, and sends the extracted old data 305 to the NAS device 103 (1802). The disk device 105 then ends the DISK_get_old routine 208.

As described above, the storage system 100 in the second embodiment obtains update points from the file update log table 502, not from the journal table 116. However, since only immediate update points can be obtained by the storage system 100 from the file update log table 502 that is stored in the primary volume 113, the storage system 100 obtains the past file update log table 502 from the journal table 116.

The journal table 116 in the second embodiment does not need to contain the FID 304 which is file level information. Therefore, according to the second embodiment, this invention can be applied to the storage system 100 without altering the disk device 105.

While the present invention has been described in detail and pictorially in the accompanying drawings, the present invention is not limited to such detail but covers various obvious modifications and equivalent arrangements, which fall within the purview of the appended claims.

What is claimed is:

1. A storage system connected to a host computer, comprising:
    at least one interface connected to the host computer;
    at least one processor connected to the interface;
    at least one memory connected to the processor; and
    at least one disk drive which stores data requested by the host computer to be written,
    wherein the processor executes programs stored in the memory to implement a file system input/output processing unit receiving from the host computer a request to read data from a file and a request to write data in a file, and a block input/output processing unit reading and writing data from and to blocks in the disk drive,
    wherein the block input/output processing unit provides, to the file system input/output processing unit, storage areas of the disk drive as plural volumes including a first volume, a second volume, and a third volume, the first volume storing a file which is accessed by the host computer, the second volume storing a block write history which includes association between each of the blocks and a time when data is written in the block, the third volume storing a replication of data existing in the first volume at a specific time,
    wherein the block input/output processing unit refers to the block write history stored in the second volume to overwrite the replication data stored in the third volume with a replication of data existing in the first volume at a different time from the specific time,
    wherein the block write history stored in the second volume further includes information about which block is associated with which file;
    wherein, upon receiving file designation from the file system input/output processing unit, the block input/output processing unit extracts from the block write history stored in the second volume a part of the block write history relevant to blocks that are associated with the designated file, and
    wherein the block input/output processing unit sends the extracted part of the block write history to the file system input/output processing unit.

2. The storage system according to claim 1,
    wherein the block write history includes at least one of data stored in each block prior to data write and data stored in the block after the data write, and
    wherein, when the file system input/output processing unit designates one write time out of write times included in the part of the block write history sent from the block input/output processing unit, the block input/output processing unit refers to the block write history stored in the second volume to overwrite the replication data stored in the third volume with a replication of data existing in the first volume at the designated write time.

3. The storage system according to claim 1,
    wherein the block input/output processing unit identifies a latest write time out of write times included in the extracted part of the block write history, and
    wherein the block input/output processing unit refers to the block write history stored in the second volume to overwrite the replication data stored in the third volume with a replication of data existing in the first volume at the write time identified as the latest.

4. A disk device connected to a NAS device which receives, from a host computer, a request to read data from a file and a request to write data in a file, comprising:
    at least one interface connected to the NAS device;
    at least one processor connected to the interface;
    at least one memory connected to the processor; and
    at least one disk drive which stores data requested by the host computer to be written,
    wherein the processor reads and writes data from and to blocks of the disk drive,
    wherein the processor provides, to the NAS device, storage areas of the disk drive as plural volumes including a first volume, a second volume, and a third volume, the first volume storing a file which is accessed by the host computer, the second volume storing a block write history which includes association between each of the blocks and a time when data is written in the block, the third volume storing a replication of data existing in the first volume at a specific time,
    wherein the processor refers to the block write history stored in the second volume to overwrite the replication data stored in the third volume with a replication of data existing in the first volume at a different time from the specific time,
    wherein the block write history stored in the second volume further includes information about which block is associated with which file,
    wherein, upon receiving file designation from the NAS device, the processor extracts from the block write history stored in the second volume only a part of the block write history relevant to blocks that are associated with the designated file, and
    wherein the processor sends the extracted part of the block write history to the NAS device.

5. The disk device according to claim 4,
    wherein the block write history includes at least one of data stored in each block prior to data write and data stored in the block after the data write; and
    wherein, when the NAS device designates one write time out of write times included in the part of the block write history sent from the processor, the processor refers to the block write history stored in the second volume to overwrite the replication data stored in the third volume with a replication of data existing in the first volume at the designated write time.

6. The disk device according to claim 4,
    wherein the processor identifies a latest write time out of write times included in the extracted part of the block write history, and
    wherein the processor refers to the block write history stored in the second volume to overwrite the replication data stored in the third volume with a replication of data existing in the first volume at the write time identified as the latest.

7. A method of restoring data in a storage system which is connected to a host computer and which has at least one disk drive in which data requested by the host computer to be written is stored, comprising the steps of:

receiving from the host computer a request to read data from a file and a request to write data in a file;

reading and writing data from and to blocks in the disk drive as requested by the received read request and write request;

providing storage areas of the disk drive as plural volumes including a first volume, a second volume, and a third volume, the first volume storing a file which is accessed by the host computer, the second volume storing a block write history which includes association between each of the blocks, a time and information about which block is associated with which file when data is written in the block, the third volume storing a replication of data existing in the first volume at a specific time;

referring to the block write history stored in the second volume to overwrite the replication data stored in the third volume with a replication of data existing in the first volume at a different time from the specific time;

upon receiving file designation, extracting from the block write history stored in the second volume a part of the block write history relevant to blocks that are associated with the designated file; and sending the extracted part of the block write history.

8. The data restoration method according to claim 7, wherein the block write history includes at least one of data stored in each block prior to data write and data stored in the block after the data write, and wherein the data restoration method further comprises:
referring, when one write time is designated out of write times included in the sent part of the block write history, to the block write history stored in the second volume to overwrite the replication data stored in the third volume with a replication of data existing in the first volume at the designated write time.

9. The data restoration method according to claim 7, further comprising the steps of:

identifying a latest write time out of write times included in the extracted part of the block write history; and referring to the block write history stored in the second volume to overwrite the replication data stored in the third volume with a replication of data existing in the first volume at the write time identified as the latest.

10. A storage system connected to a host computer, comprising:

at least one interface connected to the host computer;
at least one processor connected to the interface;
at least one memory connected to the processor; and
at least one disk drive which stores data requested by the host computer to be written, wherein the processor executes programs stored in the memory to implement a file system input/output processing unit receiving from the host computer a request to read data from a file and a request to write data in a file, and a block input/output processing unit reading and writing data from and to blocks in the disk drive, wherein the block input/output processing unit provides, to the file system input/output processing unit, storage areas of the disk drive as plural volumes including a first volume, a second volume, and a third volume, the first volume storing a file which is accessed by the host computer, the second volume storing a block write history which includes association between each of the blocks and a time when data is written in the block, the third volume storing a replication of data existing in the first volume at a specific time, wherein the block input/output processing unit refers to the block write history stored in the second volume to overwrite the replication data stored in the third volume with a replication of data existing in the first volume at a different time from the specific time, wherein the block input/output processing unit extracts, when block designation is received from the file system input/output processing unit, a part of the block write history relevant to the designated blocks from the block write history stored in the second volume, and wherein the block input/output processing unit sends the extracted part of the block write history to the file system input/output processing unit.

11. The storage system according to claim 10, wherein the first volume stores a write log which indicates association between each file and a time when data is written in the file, wherein, based on the sent part of the block write history, the file system input/output processing unit restores a past write log stored in the first volume, and wherein, based on the write log stored in the first volume and the restored past write log, the file system input/output processing unit creates a list of file write times.

12. The storage system according to claim 11, wherein the block write history includes at least one of data stored in each block prior to data write and data stored in the block after the data write, wherein the file system input/output processing unit sends the created list of file write times to the host computer, and wherein, when the host computer designates, to the file system input/output processing unit, one write time included in the list of file write times sent from the file system input/output processing unit, the block input/output processing unit refers to the block write history stored in the second volume to overwrite the replication data stored in the third volume with a replication of data existing in the first volume at the designated write time.

13. The storage system according to claim 11, wherein the file system input/output processing unit identifies a latest write time from the created list of file write times, and wherein the block input/output processing unit refers to the block write history stored in the second volume to overwrite the replication data stored in the third volume with a replication of data existing in the first volume at the write time identified as the latest.

* * * * *